United States Patent

Wang

[11] Patent Number: 5,958,001
[45] Date of Patent: Sep. 28, 1999

[54] OUTPUT-PROCESSING CIRCUIT FOR A NEURAL NETWORK AND METHOD OF USING SAME

[75] Inventor: Shay-Ping Thomas Wang, Long Grove, Ill.

[73] Assignee: Motorola, Inc., Schaumburg, Ill.

[21] Appl. No.: 08/220,772

[22] Filed: Mar. 31, 1994

[51] Int. Cl.$^6$ .................................................... G06F 7/50
[52] U.S. Cl. ........................ 708/670; 708/709; 708/705
[58] Field of Search ................... 364/768, 785, 364/786; 708/670, 709, 705

[56] References Cited

U.S. PATENT DOCUMENTS

| | | | |
|---|---|---|---|
| 3,631,231 | 12/1971 | Lagemann et al. | 364/785 |
| 3,707,621 | 12/1972 | Krutz et al. | 364/768 |
| 3,941,990 | 3/1976 | Rabasse | 364/785 |
| 4,215,416 | 7/1980 | Muramatsu | 364/768 |
| 4,367,535 | 1/1983 | Matsuyama | 364/768 |
| 5,146,420 | 9/1992 | Vassiliadis et al. | 364/786 |
| 5,375,079 | 12/1994 | Uramoto et al. | 364/768 |

OTHER PUBLICATIONS

Cokier et al, "Multiple Input Serial Adder Using Counter" *IBM Tech. Disclosure Bullitin* vol. 19 No. 11 Apr. 1977 pp. 4215–4216.

*Primary Examiner*—David H. Malzahn

[57] ABSTRACT

An output-processing circuit for a neural network, which may be implemented on an integrated circuit, comprises at least one latch and at least one adder. Outputs from a plurality of neurons are sequentially received by the output-processing circuit. The output-processing circuit uses gating functions to determine which neuron outputs are summed together to produce neural network outputs.

19 Claims, 5 Drawing Sheets

OUTPUT-PROCESSING CIRCUIT FOR A NEURAL NETWORK AND METHOD OF USING SAME

RELATED INVENTIONS

The present invention is related to the following inventions which are assigned to the same assignee as the present invention:

(1) "Artificial Neuron Circuit and Method of Using Same", having Ser. No. 07/076,602;

(2) "Neural Network and Method of Using Same", having Ser. No. 07/076,601;

TECHNICAL FIELD

This invention relates generally to artificial neural networks and, in particular, to a neural network that can be implemented in a VLSI (very large scale integration) chip, and which utilizes summing circuits to produce neural network outputs.

BACKGROUND OF THE INVENTION

Artificial neural networks have utility in a wide variety of computing environments, such as speech recognition, process control, optical character recognition, handwriting recognition, continuous logic or fuzzy logic, engineering and scientific computations, signal processing, and image processing. Processing engines for many of the foregoing computing environments may be implemented through neural networks comprising a plurality of elemental logic elements called neuron circuits.

A neuron circuit (or processing element) is the fundamental building block of a neural network. A neuron circuit has multiple inputs and one output. The above-identified Related Invention No. 1 discloses, in one embodiment, a neuron circuit which comprises only an adder as its main processing element.

As discussed in Related Invention No. 2 identified above, there are more than twenty known types of neural network architectures, of which the "back-propagation", "perceptron", and "Hopfield network" are the best known. Related Invention No. 2 discloses, in one embodiment, a neural network which does not require repetitive training, which yields a global minimum to each given set of input vectors, and which has an architecture that comprises three layers.

The three layers of Related Invention No. 2 identified above are known as the "input layer", the "hidden layer", and the "output layer". The function of the input layer is to receive a plurality of neural network inputs and then distribute them to the inputs of a plurality of neuron circuits contained in the hidden layer. The hidden layer comprises a plurality of neuron circuits. Each neuron circuit in the hidden layer may perform arithmetic operations on its inputs to produce a corresponding neuron circuit output. The output layer receives as inputs the outputs of the plurality of neuron circuits and sums them to produce neural network outputs.

It is thus a primary function of the output layer to sum the outputs of the neuron circuits contained in the hidden layer. Various output-processing circuits for neural networks are known in the art, including some which utilize output layers to sum the outputs of the hidden layer.

FIG. 1, for example, is a block diagram of a prior art digital adder chain for producing a neural network output. The outputs of neuron circuits 1 and 3 are coupled to adder circuit 5, and the outputs of neuron circuits 7 and 9 are coupled to adder circuit 11. The outputs of adder circuits 5 and 11 are in turn coupled to adder circuit 13, which produces the neural network output y.

The adder chain shown in FIG. 1 suffers a serious drawback, in that it consumes a large amount of space when implemented on an integrated circuit. The reason for this is that digital adder circuits are limited to receiving only two operands at a time. Consequently, the number of adder circuits required in an adder chain is N−1, where N is the number of neuron circuits that provide inputs to the adder chain. Furthermore, a neural network output-processing circuit producing a plurality of outputs would require one adder chain per output. In other words, a typical neural network output-processing circuit using an adder chain requires a large number of adder circuits and thus consumes a vast amount of silicon space when implemented on an integrated circuit.

FIG. 2 is a block diagram of a prior art multiple-RISC (Reduced Instruction Set Computer) circuit for producing a neural network output. In the circuit shown in FIG. 2, the outputs of neuron circuits 20, 22, 24, and 26 are sequentially broadcast across bus 27 to RISC 32 and RISC 34. Each RISC is responsive to a predetermined number of the neuron circuit outputs and sums these outputs to produce a corresponding neural network output. The output 36 of RISC 32 is neural network output $y_1$, and the output 38 of RISC 34 is neural network output $y_2$.

Unfortunately, the approach shown in FIG. 2 requires the use of at least one RISC. RISC's consume large integrated circuit areas and are expensive. Furthermore, RISC's used in a neural network output layer require programming which is difficult and time-consuming.

FIG. 3 is a block diagram of a prior art circuit, using a single RISC circuit and a plurality of adder circuits, for producing neural network outputs. In the circuit shown in FIG. 3, the outputs of neuron circuits 50, 52, 54, and 56 are sequentially broadcast across bus 57 to RISC 60. RISC 60 is connected to addressable latches 68 and 70 via bus 63. Upon receiving a neuron circuit output on bus 57, RISC 60 writes the neuron circuit output to one or both of the addressable latches. RISC 60 can write to only one of the latches at a time across bus 63. RISC 60 is programmed to determine which latch receives which neuron circuit output and in what order the latches receive the neuron circuit outputs. The output of latch 68 is connected to a first input of adder circuit 76 via line 72. Adder circuit 76 sums neuron circuit outputs received by latch 68. The output of adder 76 is connected via line 78 to a second input of adder 76. Adder 76 updates its output 84 when RISC 60 writes to latch 68. The output 84 of adder circuit 76 represents neural network output $y_1$.

Likewise, the output of latch 70 is connected to a first input of adder circuit 80 via line 74. Adder circuit 80 sums neuron circuit outputs received by latch 70. The output of adder 80 is connected via line 82 to a second input of adder 80. Adder 80 updates its output 86 when RISC 60 writes to latch 70. The output 86 of adder circuit 86 represents neural network output $y_2$.

The approach shown in FIG. 3 suffers the same drawbacks as the prior art circuit shown in FIG. 2. The RISC consumes a large integrated circuit area and is expensive. Furthermore, the RISC requires programming which is difficult, time-consuming, and expensive.

Therefore, there is a significant need for a neural network output-processing circuit which has a straight-forward architecture and which is easy and inexpensive to implement.

SUMMARY OF INVENTION

A preferred embodiment of an output-processing circuit designed in accordance with the teachings of the present invention uses at least one latch and at least one adder circuit to produce neural network outputs. In contrast to conventional output-processing circuits which require large amounts of area on a integrated circuit, an output-processing circuit constructed in accordance with the present invention uses significantly less silicon space on an integrated circuit.

Moreover, in contrast to conventional output-processing circuits, there is provided in accordance with the present invention an output-processing circuit which is straightforward to program.

In addition, an output-summing circuit constructed in accordance with the present invention can produce a plurality of neural network outputs by providing multiple summing circuits for summing the outputs of neuron circuits. The individual neuron circuits do not each require summing circuits.

Thus it will be appreciated that an output-processing circuit constructed in accordance with the present invention performs with a vast reduction in the cost and complexity of its implementation, resulting in a product which is commercially competitive due to its low cost of manufacture.

It is an advantage of the present invention to provide various methods of using an output-processing circuit in accordance with the present invention.

According to one aspect of the invention, there is provided a processing circuit for processing the output of an artificial neuron, the neuron generating a sequence of outputs, the processing circuit being coupled to the neuron outputs and to an output gating function, the processing circuit comprising: a latch responsive to one of the neuron outputs and to the output gating function, the latch generating an output representative of the neuron output or zero, depending upon the value of the output gating function; and an adder circuit for generating an output, the adder circuit being responsive to the latch output and to its own output.

According to another aspect of the invention, there is provided in a processing circuit receiving a sequence of neuron outputs $x_i$, wherein i is a positive integer, a method of producing a neural network output comprising the steps of: (a) receiving a first of the sequence of neuron outputs; (b) applying a first gating function to the neuron output to produce a first gated input; (c) adding the first gated input to a sum; (d) determining whether all of the sequence of neuron outputs have been received; (i) if so, assigning the sum as the output of the processing circuit; (ii) if not, proceeding to step (e); (e) receiving another of the sequence of neuron outputs; (f) applying another gating function to the neuron output to produce another gated input; (g) adding the another gated input to the sum to produce a further sum; and (h) returning to step (d) until all of the sequence of neuron outputs have been received.

BRIEF DESCRIPTION OF THE DRAWINGS

The invention is pointed out with particularity in the appended claims. However, other features of the invention will become more apparent, and the invention will be best understood, by referring to the following detailed description in conjunction with the accompanying drawings in which:

DETAILED DESCRIPTION OF A PREFERRED EMBODIMENT

It will be understood by one of ordinary skill in the art that the terms "neuron circuit" and "neuron" are used interchangeably in this description, as are the terms "adder", "adder circuit", "summing circuit", or "summer".

Figure 1:
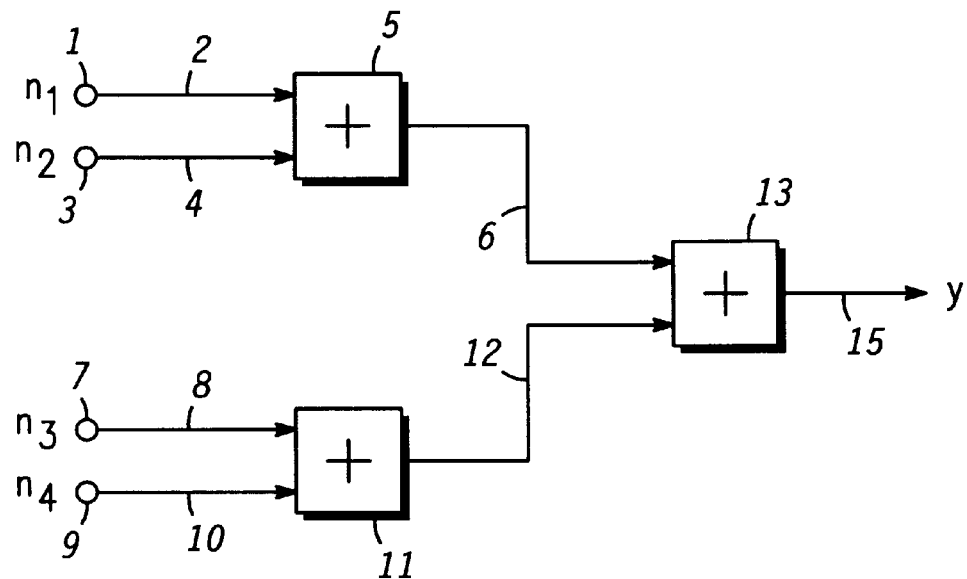
FIG. 1 is a block diagram of a prior art digital adder chain for producing a neural network output.
Figure 2:
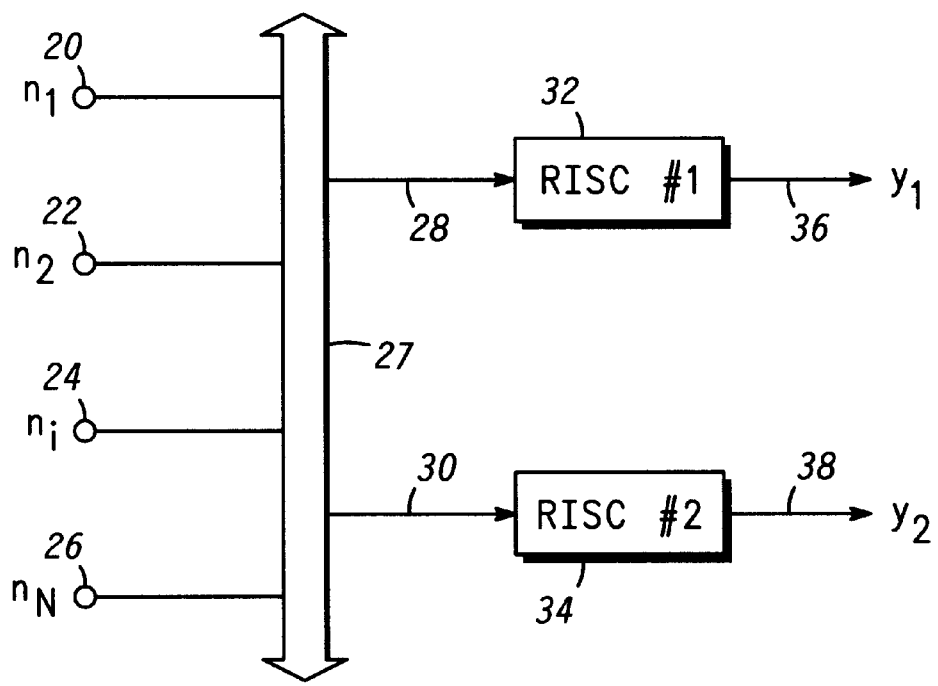
FIG. 2 is a block diagram of a prior art multiple-RISC circuit for producing a neural network output.
Figure 3:
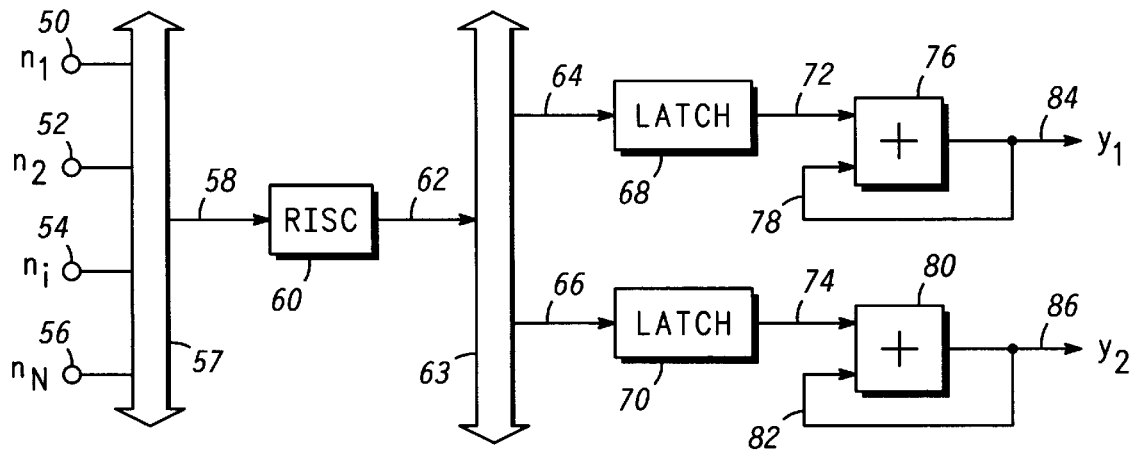
FIG. 3 is a block diagram of a prior art circuit, using a single-RISC circuit and an adder chain, for producing a neural network output.
Figure 4:
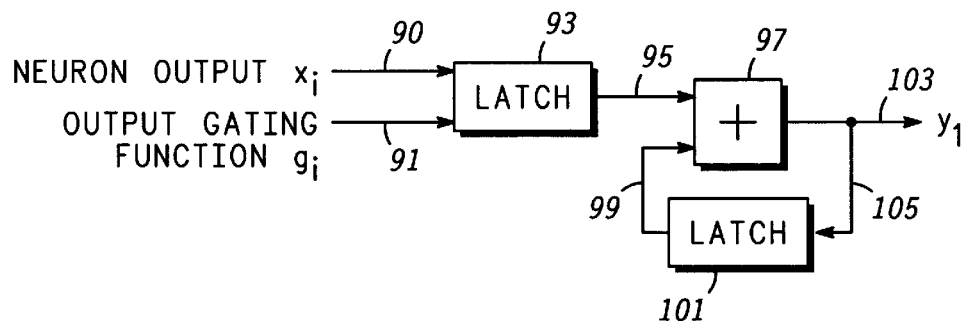
FIG. 4 is a block diagram of a neuron output-processing circuit in accordance with the present invention.

FIG. 4 is a block diagram of a neuron output-processing circuit in accordance with the present invention. In this embodiment, a plurality of individual neuron outputs $x_i$ are sequentially applied to the output-processing circuit. The output-processing circuit in turn generates a sequence of neural network outputs.

The output-processing circuit comprises two primary elements: an input latch 93 and an adder 97. A feedback latch 101 is also shown as part of this implementation. However, it will be understood by those skilled in the art that such a feedback latch is not required in all embodiments of the present invention, namely those embodiments which implement adder 97 by using a clocked adder.

It will be understood by one of ordinary skill in the art that the widths of data busses 90, 95, 99, 103, and 105 may be 32 bits or any other desired value.

Input latch 93 receives neuron outputs $x_i$ over data bus 90. Input latch 93 serves to hold input data in order to produce the desired gated input. Input latch 93 is responsive to an output gating function line 91 over which are provided values $g_i$ for the corresponding input values $x_i$.

Inputs $x_1, x_2, \ldots, x_n$ are gated by respective gating functions $g_1, g_2, \ldots, g_n$ to produce gated inputs. If $g_i=0$, then the gated input corresponding to $x_i$ is 0; if $g_i$ is not equal to 0, then the gated input corresponding to $x_i$ is $x_i$. The gated inputs are output from input latch 93 and provided to one input of adder 97 by data bus 95.

The gated inputs are summed together by adder 97, and the resulting summation is the neural network output $y_1$ from adder 97 over data bus 103.

The summation of the gated inputs is accomplished as follows. The output of adder 97 is coupled to the input of feedback latch 101 by bus segment 105. Feedback latch 101 temporarily holds the output of adder 97 on bus segment 99 for addition with the output of input latch 93. Bus segment 99 is coupled to a second input of adder 97.

The output-processing circuit of the embodiment shown in FIG. 4 thus generates a neural network output of the form $x_1+x_2+x_3+\ldots x_n$.

Figure 5:
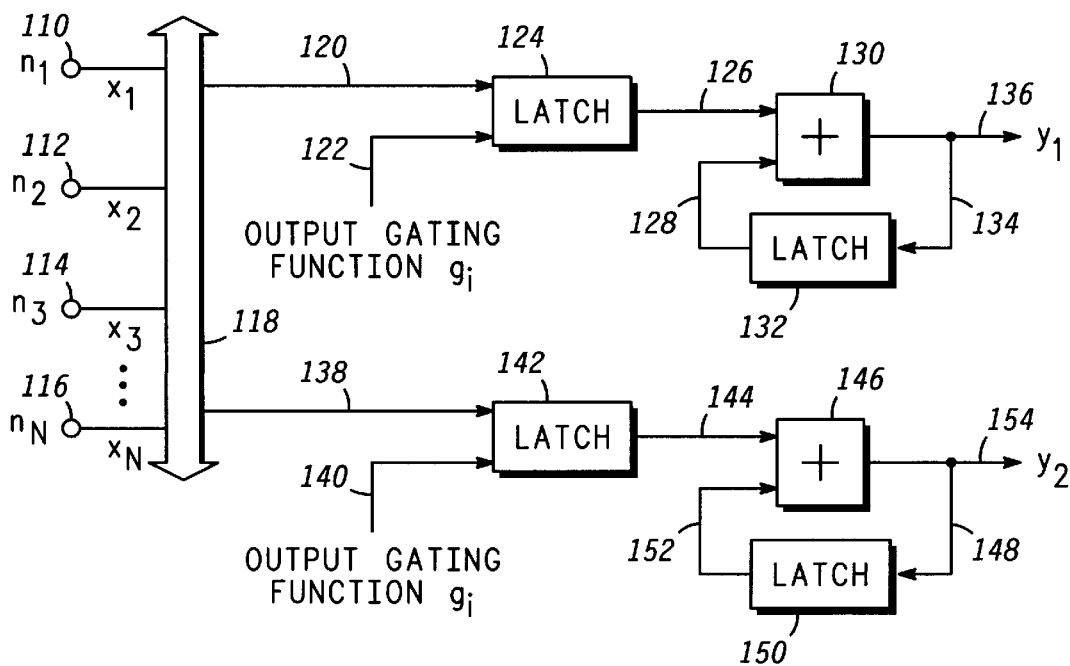
FIG. 5 is a block diagram of a multiple-neuron output-processing circuit in accordance with a preferred embodiment of the invention.

FIG. 5 is a block diagram of a multiple-neuron output-processing circuit in accordance with a preferred embodiment of the invention. In this embodiment, the outputs of a plurality of artificial neurons are sequentially broadcast to the inputs of the output-processing circuit. The output-processing circuit in turn generates a plurality of neural network outputs.

Although FIG. 5 shows an output-processing circuit which generates only two neural network outputs $y_1$ and $y_2$, it will be understood by one skilled in the art that an output-processing circuit implemented in accordance with the present invention may have two or more outputs.

The embodiment shown in FIG. 5 comprises two summing circuits in the output-processing circuit. The summing circuits may perform their operations in parallel. Again, it will be understood by one of ordinary skill that a different number of summing circuits may be used if a particular application requires fewer or more than two outputs.

The output-processing circuit shown in FIG. 5 is responsive to a plurality of neuron circuit outputs $x_1, x_2, x_3, \ldots, x_n$. Neuron circuits 110, 112, 114, and 116 sequentially broadcast their outputs across data bus 118. It will be understood by one of ordinary skill that the order in which the neuron circuits present their corresponding outputs on data bus 118 is unimportant.

Neuron circuit outputs $x_i$ which are present on data bus 118 are simultaneously received by input latch 124 via data bus 120 and by input latch 142 via data bus 138.

It will be understood by one of ordinary skill in the art that the widths of data busses 118, 120, 126, 128, 134, 136, 138, 144, 148, 152, and 154 may be 32 bits or any other desired value.

The first summing circuit comprises two primary elements: an input latch 124 and an adder 130. A feedback latch 132 is also shown as part of this implementation; however, it will be understood by those skilled in the art that such a feedback latch is not required in all embodiments of the present invention, namely those embodiments which implement adder 130 by using a clocked adder.

Input latch 124 serves to hold input data in order to produce a desired gated input. Input latch 124 is responsive to an output gating function line 122 over which are provided values $g_i$ for the corresponding input values $x_i$.

Inputs $x_1, x_2, \ldots, x_n$ are gated by respective gating functions $g_1, g_2, \ldots, g_n$ to produce gated inputs. If $g_i=0$, then the gated input corresponding to $x_i$ is 0; if $g_i$ is not equal to 0, then the gated input corresponding to $x_i$ is $x_i$. The gated inputs are output from input latch 124 and provided to one input of adder 130 by data bus 126.

The summation of the gated inputs in accomplished as follows. The output of adder 130 is coupled to the input of feedback latch 132 by bus segment 134. Feedback latch 132 temporarily holds the output of adder 130 on bus segment 128 for addition with the output of input latch 124. Bus segment 128 is coupled to a second input of adder 130.

The gated inputs are summed together by adder 130, and the resulting summation is the neural network output $y_1$ from adder 130 over data bus 136.

The second summing circuit also comprises two primary elements: an input latch 142 and an adder 146. A feedback latch 150 is also shown as part of this implementation; however, it is well understood by those skilled in the art that such a feedback latch is not required in all embodiments of the present invention, namely those embodiments which implement adder 146 by using a clocked adder.

Input latch 142 serves to hold input data in order to produce a desired gated input. Input latch 142 is responsive to an output gating function line 140 over which are provided values $g_i$ for the corresponding input values $x_i$.

As described above regarding the operation of input latch 124, inputs $x_1, x_2, \ldots, x_n$ are gated by respective gating functions $g_1, g_2, \ldots, g_n$ to produce gated inputs. If $g_i=0$, then the gated input corresponding to $x_i$ is 0; if $g_i$ is not equal to 0, then the gated input corresponding to $x_i$ is $x_i$. The gated inputs are output from input latch 142 and provided to one input of adder 146 by data bus 144.

It will be understood by those skilled in the art that the gating function $g_i$ provided over line 140 to input latch 124 is not necessarily the same gating function $g_i$ provided over line 122 to input latch 142.

The summation of the gated inputs is accomplished as follows. The output of adder 146 is coupled to the input of feedback latch 150 by bus segment 148. Feedback latch 150 temporarily holds the output of adder 146 on bus segment 152 for addition with the output of input latch 142. Bus segment 152 is coupled to a second input of adder 146.

The gated inputs are summed together by adder 146, and the resulting summation is the neural network output $y_2$ from adder 146 over data bus 154.

The output-processing circuit of the embodiment shown in FIG. 5 thus generates neural network outputs of the form $x_1 + x_2 + x_3 + \ldots x_n$ substantially in a manner as described in Related Invention No. 2.

Figure 6:
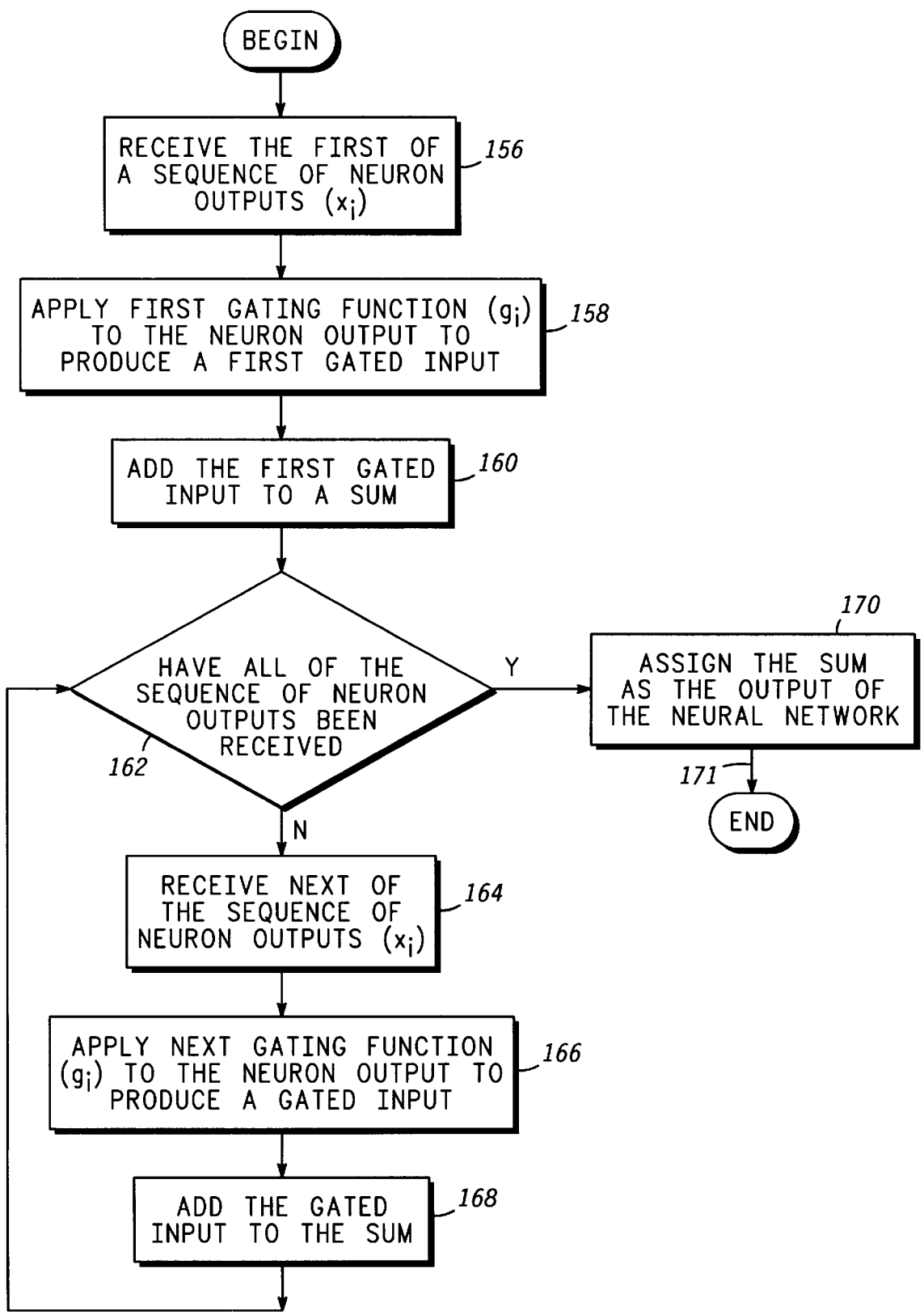
FIG. 6 is a flow diagram of a method of using the output-processing circuit illustrated in FIG. 4.

FIG. 6 is a flow diagram of a method of using the output-processing circuit illustrated in FIG. 4.

As illustrated in box 156, a first neuron output $x_i$ is received by the output-processing circuit, e.g. by latch 93 of FIG. 4.

Next as illustrated in box 158, a first gating function $g_i$ is applied to the first input to produce a first gated input.

Next, as illustrated in box 160, the first gated input is added to a sum.

Next, regarding decision box 162, a check is made to determine whether all neuron outputs have been received. If so, the process proceeds to box 170. If not, the process proceeds to box 164.

As illustrated in box 170, the sum is assigned as an output of the neural network. Exiting box 170 via line 171, the procedure is finished with the current batch of neuron circuit outputs.

As illustrated in box 164, a next neuron output $x_i$ is received by the output-processing circuit.

As illustrated in box 166, the next gating function $g_i$ is applied to the neuron output to produce a gated input.

As illustrated in box 168, the gated input is added to the sum.

The procedure then exits box 168 and returns to decision box 162.

Figure 7:
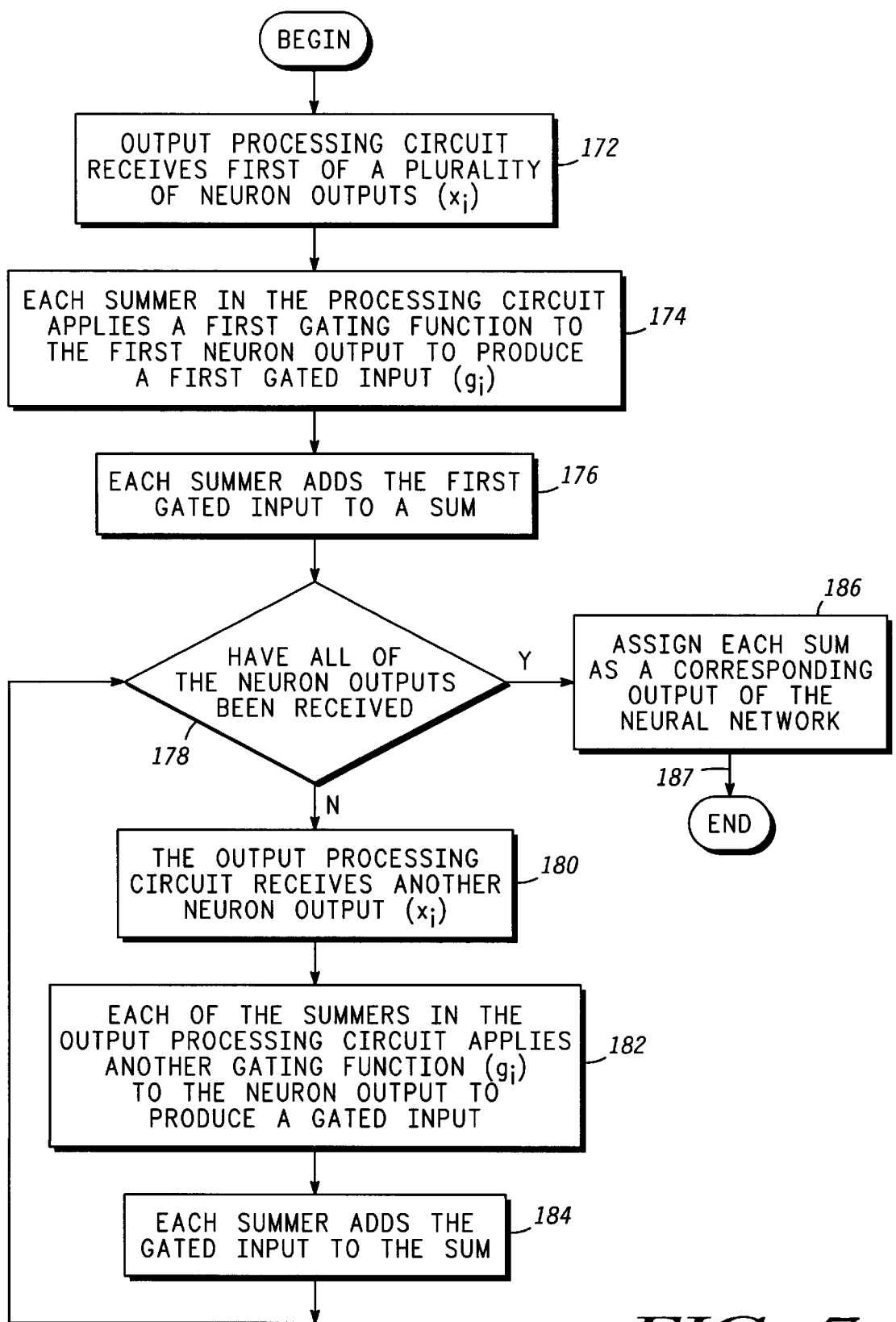
FIG. 7 is a flow diagram of a method of using the output-processing circuit illustrated in FIG. 5.

FIG. 7 is a flow diagram of a method of using the output-processing circuit illustrated in FIG. 5.

As illustrated in box 172, a first output $x_i$ from a plurality of neuron circuits is received by the neural network output-processing circuit, e.g. by latches 124 and 142 of FIG. 5.

Next as illustrated in box 174, each summer circuit within the output-processing circuit applies a respective first gating function $g_i$ to the first input to produce a corresponding first gated input.

Next, as illustrated in box 176, each summer circuit adds the first gated input to a sum.

Next, regarding decision box 178, a check is made to determine whether all neuron outputs have been received. If so, the process proceeds to box 186. If not, the process proceeds to box 180.

As illustrated in box 186, each sum is assigned as a corresponding output of the neural network. Exiting box 186 via line 187, the procedure is finished with the current batch of neuron circuit outputs.

As illustrated in box 180, a next neuron output $x_i$ is received by the output-processing circuit.

As illustrated in box 182, each summer circuit within the output-processing circuit applies another respective gating function $g_i$ to the input to produce a corresponding gated input.

As illustrated in box 184, each summer circuit adds the gated input to the sum.

The procedure then exits box 184 and returns to decision box 178.

Figure 8:
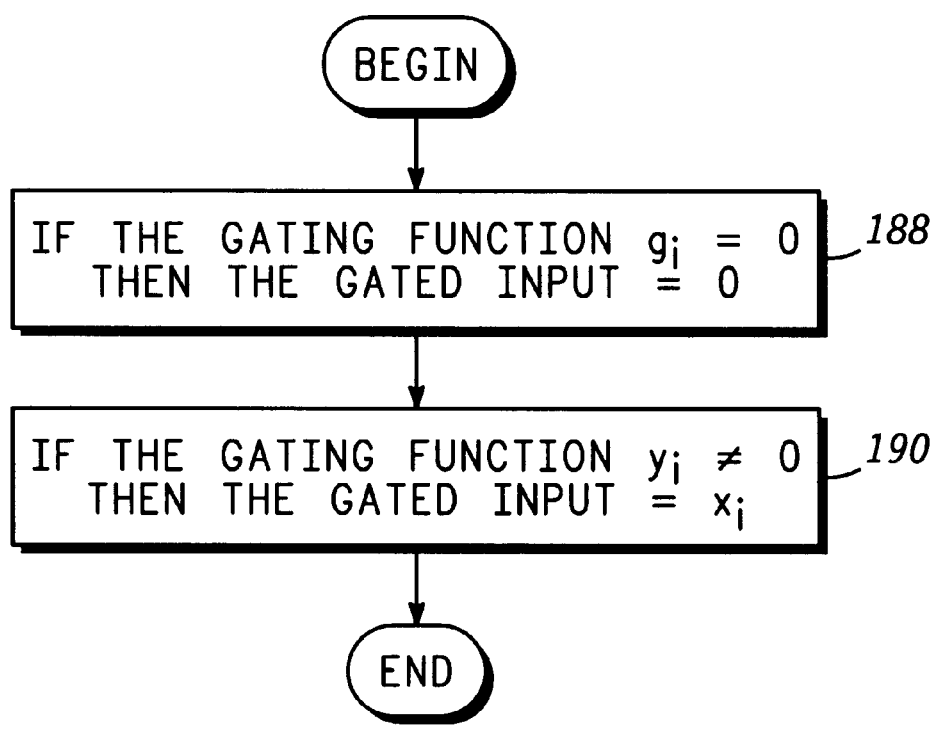
FIG. 8 is a flow diagram of a gating function which may form part of the methods of using an output-processing circuit as illustrated in FIGS. 6 and 7.

FIG. 8 shows a flow diagram of a gating function which may form part of the methods of using an output-processing circuit as illustrated in FIGS. 6 and 7.

With reference to FIGS. 6, 7 and 8, the gating functions $g_i$ applicable to the inputs $x_i$ of the output-processing circuit may be expressed by the following: (a) if the gating function $g_i$ is 0, the gated input is 0 (refer to box 188 of FIG. 8); (b) if the gating function $g_i$ is not 0, the gated input is $x_i$ (refer to box 190 of FIG. 8).

The neural network output-processing circuits of FIGS. 6 and 7 thus generate outputs of the form $x_1 + x_2 + x_3 + \ldots + x_n$ substantially in a manner as described in Related Invention No. 2.

OPERATION OF A PREFERRED EMBODIMENT

With reference now to FIG. 4, the operation of a preferred embodiment of the invention will be described. In the example given below, the objective is to generate a neural network output $y_1 = x_1 + x_3$ for any value of input variables $x_1$ and $x_3$.

Initially, input latch 93 is loaded with neuron circuit output $x_1$. The gating function $g_1$ is not equal to 0, and thus the value of $x_1$ is passed to adder 97. The initial data contents and output of feedback latch 101 are 0. Thus, the first sum which is present on data bus 103 is $x_1$.

Input latch 93 is next loaded with neuron circuit output $x_2$. The gating function $g_2=0$ and thus the value of the gated input passed from latch 93 to the first input of adder 97 via data bus 95 is 0. The contents of feedback latch 101 are updated at this point to the sum currently present on data bus 103, which is the value of $x_1$. Thus, $x_1$ is presented to the second input of adder 97 via data bus 99, and the resulting summation output from adder 97 via data bus 103 is still $x_1$.

Neuron circuit output $x_3$ is then loaded into input latch 93. The gating function $g_3$ is not equal to 0, and thus the gated input, which is the value of $x_3$, is passed to the first input of adder 97. The contents of feedback latch 101 are updated at this point to the sum currently present on data bus 103, which is the value of $x_1$. Thus, $x_1$ is presented to the second input of adder 97 via data bus 99, and the resulting summation output from adder 97 via data bus 103 is $x_1 + x_3$. The neural network output $y_1$ is thus equal to $x_1 + x_3$.

The output-processing circuit may continue to receive a sequence of neuron circuit outputs $x_4, x_5, \ldots, x_n$. However, the corresponding gating functions $g_4, g_5, \ldots, g_n$ are all 0; thus, the first input of adder 97 will remain at 0, resulting in the final neural network output $y_1 = x_1 + x_3$.

SUMMARY

Thus there has been described herein a concept, as well as several embodiments including a preferred embodiment, of a neural network output-processing circuit, and methods of producing neural network outputs, which require only adders and latches as their primary elements.

Therefore, a neural network output-processing circuit can be implemented in a VLSI chip with a vast reduction in size. This results in a neural network having significant commercial advantage over those of the prior art in terms of processing power, cost of manufacture, versatility of application, and market acceptance.

In the above-identified Related Invention No. 2 there are disclosed various embodiments of neural networks which may take advantage of the herein-disclosed output-processing circuit as an output layer. This is because of the significant size and cost savings of such an output-processing circuit. Above-identified Related Invention No. 2 may also use the herein-disclosed output-processing circuit to great advantage in implementing the polynomial expansions or orthogonal functions which form the basis of operation of the neural networks therein described.

Therefore, there has been described herein an output-processing circuit that can be an element of a neural network which does not require lengthy training cycles and which converges on a global solution in a single training cycle.

Furthermore, it will be apparent to those skilled in the art that the disclosed invention may be modified in numerous ways and may assume many embodiments other than the preferred form specifically set out and described above.

For example, it is a matter of design choice regarding such system structural elements as the number of inputs, number of summers or summer circuits, the number of outputs, and the use of feedback latches, depending upon the integrated circuit technology, type of implementation (e.g. analog, digital, software, etc.), die sizes, pin-outs, and so on.

Accordingly, it is intended by the appended claims to cover all modifications of the invention which fall within the true spirit and scope of the invention.

What is claimed is:

1. A processing circuit for processing the output of an artificial neuron, said neuron generating a sequence of outputs, said processing circuit being coupled to said neuron outputs and to an output gating function, said processing circuit comprising:

a latch responsive to one of said neuron outputs and to said output gating function, said latch generating an output representative of said neuron output or zero, depending upon the value of said output gating function; and an adder circuit for generating an output, said adder circuit being responsive to said latch output and to its own output.

2. The processing circuit recited in claim 1 wherein said latch performs a gating function ($g_i$) sequentially on each of said sequence of neuron outputs, whereby said latch outputs are generated as follows:

(a) if said gating function is 0, pass 0 to said adder circuit; and (b) if said gating function is not 0, pass said neuron output to said adder circuit.

3. The processing circuit recited in claim 2 wherein said processing circuit is contained on at least one integrated circuit.

4. A processing circuit for processing the outputs of a plurality of artificial neurons, each of said neurons generating a sequence of outputs, said processing circuit being coupled to said neuron outputs and to an output gating function, said processing circuit comprising:

a latch responsive to at least one neuron output and to said output gating function, said latch generating an output representative of said at least one neuron output or zero, depending upon the value of said output gating function; and an adder circuit for generating an output, said adder circuit being responsive to said latch output and to its own output.

5. The processing circuit recited in claim 4 wherein said latch performs a gating function ($g_i$) sequentially on each of said plurality of neuron outputs, whereby said latch outputs are generated as follows:

(a) if said gating function is 0, pass 0 to said adder circuit;

(b) if said gating function is not 0, pass said neuron output to said adder circuit.

6. The processing circuit recited in claim 5 wherein said processing circuit is contained on at least one integrated circuit.

7. A processing circuit for processing the outputs of a plurality of artificial neurons, each of said neurons generating a sequence of outputs, said processing circuit being coupled to said neuron outputs and to output gating functions, said processing circuit comprising:

a plurality of latches, each responsive to at least one neuron output and to one of said output gating functions, each latch generating an output representative of said at least one neuron output or zero, depending upon the value of said output gating function; and a plurality of adder circuits, each responsive to a respective one of said latch outputs and to its own output, for generating a plurality of respective outputs.

8. The processing circuit recited in claim 7 wherein each of said latches performs a gating function sequentially on each of said plurality of neuron outputs, whereby said latch outputs are generated as follows:

(a) if said gating function is 0, pass 0 to said adder circuit;

(b) if said gating function is not 0, pass said neuron output to said adder circuit.

9. The processing circuit recited in claim 8 wherein said processing circuit is contained on at least one integrated circuit.

10. A processing circuit for selectively summing the output of an artificial neuron, said neuron generating a sequence of neuron outputs, said processing circuit comprising:

first latch means, responsive to said sequence of neuron outputs, for selectively storing ones of said neuron outputs and for providing said ones of said neuron outputs as an output thereof;

second latch means for providing an output;

an adder circuit for generating a sum, said adder circuit having a first input responsive to the output of said first latch means and a second input responsive to the output of said second latch means;

wherein said first latch means is further responsive to a plurality of gating functions $g_i$, there being a gating function $g_i$ corresponding to each of said neuron outputs;

said first latch means storing a given neuron output if $g_i$ is not 0;

said given neuron output being applied to the input of said adder circuit and added to said sum if $g_i$ is not 0;

wherein said second latch means is responsive to said sum for storing said sum and for providing said stored sum as said output thereof; and wherein said processing circuit generates an output which includes said sum.

11. The processing circuit recited in claim 10, wherein each of said neuron outputs comprises a plurality of bits.

12. The processing circuit recited in claim 10 wherein said processing circuit is contained on at least one integrated circuit.

13. A processing circuit for selectively summing the outputs of a plurality of artificial neurons, each of said neurons generating a sequence of neuron outputs, said processing circuit generating a plurality of neural network outputs, and said processing circuit comprising:

a plurality of summers, each of said summers generating at least one of said neural network outputs, and each of said summers comprising:

first latch means, responsive to at least one of said neuron outputs, for selectively storing ones of said neuron outputs and for providing said ones of said neuron outputs as an output thereof;

second latch means for providing an output;

an adder circuit for generating a sum, said adder circuit having a first input responsive to the output of said first latch means and a second input responsive to the output of said second latch means;

wherein said first latch means is further responsive to a gating function $g_i$, there being a gating function $g_i$ corresponding to each of said neuron outputs;

said first latch means storing a given neuron output if $g_i$ is not 0;

said given neuron output being applied to the input of said adder circuit and added to said sum if $g_i$ is not 0;

wherein said second latch means is responsive to said sum for storing said sum and for providing said stored sum as an output thereof; and wherein said sum is included in said at least one of said neural network outputs.

14. The processing circuit recited in claim 13, wherein each of said neuron outputs comprises a plurality of bits.

15. The processing circuit recited in claim 14 wherein said processing circuit is contained on at least one integrated circuit.

16. In a processing circuit receiving a sequence of neuron outputs $x_i$, wherein i is a positive integer, a method of producing a neural network output comprising the following steps:

(a) receiving a first of said sequence of neuron outputs;

(b) applying a first gating function to said neuron output to produce a first gated input;

(c) adding said first gated input to a sum;

(d) determining whether all of said sequence of neuron outputs have been received;

(i) if so, assigning said sum as the output of said processing circuit;

(ii) if not, proceeding to step (e);

(e) receiving another of said sequence of neuron outputs;

(f) applying another gating function to said neuron output to produce another gated input;

(g) adding said another gated input to said sum to produce a further sum; and (h) returning to step (d) until all of said sequence of neuron outputs have been received.

17. The method recited in claim 16, wherein in steps (b) and (f) said corresponding gated inputs are produced as follows:

(i) if said gating function ($g_i$) is 0, then the value of said gated input is 0;

(ii) if said gating function is not 0, then the value of said gated input is $x_i$.

18. In a neural network output-processing circuit responsive to a plurality of artificial neuron outputs $x_i$, wherein i is a positive integer, said processing circuit generating a plurality of neural network outputs, each neuron output $x_i$ being received, in turn, by each of a plurality of summers, each summer generating at least one of said neural network outputs, a method of producing said plurality of neural network outputs comprising the following steps:

(a) said processing circuit receiving a first of said plurality of neuron outputs $x_i$;

(b) each of said summers applying a first gating function to said neuron output to produce a first gated input;

(c) each of said summers adding said first gated input to a sum;

(d) determining whether all of said plurality of neuron outputs have been received;
   (i) if so, assigning said sum as a corresponding one of said plurality of outputs of said processing circuit;
   (ii) if not, proceeding to step (e);

(e) said processing circuit receiving another of said plurality of neuron outputs;

(f) each of said summers applying another gating function to said another neuron output to produce another gated input;

(g) each of said summers adding said another gated input to said sum to produce a further sum; and (h) returning to step (d) until all of said plurality of neuron outputs $x_i$ have been received.

19. The method recited in claim 18, wherein in steps (b) and (f) said corresponding gated inputs are produced as follows:

(i) if said gating function ($g_i$) is 0, then the value of said gated input is 0;

(ii) if said gating function is not 0, then the value of said gated input is $x_i$.

* * * * *